Patented Jan. 17, 1939

2,144,463

UNITED STATES PATENT OFFICE 2,144,463

AZO DYES AND PROCESS FOR THEIR APPLICATION

Swanie S. Rossander, Wilmington, Del., assignor to E. I. du Pont de Nemours & Company, Wilmington, Del., a corporation of Delaware No Drawing. Application July 3, 1937, Serial No. 151,964

6 Claims. (Cl. 8—46)

This invention relates to new polyazo dyestuffs for the coloring of cellulose by development on the fiber. Demand has arisen in the trade for orange, red, brown, and scarlet dyes which impart desirable shades to cellulose, within which term is included those chemical compounds known as cellulose as well as those which are called regenerated cellulose, but the dyestuffs of the prior art of satisfactory shade are generally unsatisfactory in fastness to washing.

It is an object of this invention to produce dyes of the indicated colors which dye cellulose with pleasing effects, which are of excellent fastness to washing, and which possess all the other attributes, such as substantivity and durability, which are necessary for a satisfactory commercial product.

The objects of the invention are accomplished, generally speaking, by applying to cellulose a dyestuff represented by the formula:

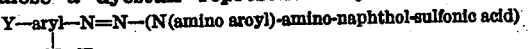
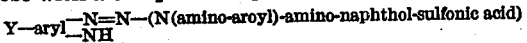

in which Y is one of a group consisting of halogen, hydrogen, alkyl, alkoxy, and aryl is of single benzene or naphthalene nucleus.

These colors are applied by impregnating cellulose with a compound represented by the formula:

Y—aryl$-{N=N \atop NH}$—(N(amino-aroyl)-amino-naphthol-sulfonic acid)

Y—aryl$-{C=O \atop N=N}$—(N(amino-aroyl)-amino-naphthol-sulfonic acid)

from an aqueous bath, diazotizing the compound on the cellulose, and coupling it.

In the following table are illustrations of the invention. In this table PAB means para-amino-benzoyl, MAB means meta-amino-benzoyl, and the arrows mean diazotized and coupled to.

| Ex. | Diazo component | Coupling component | Shade on cellulose |
|---|---|---|---|
| 1 | 1-(PAB amino)2 chlor-4-amino-benzene→(PAB J-acid)₂ | Beta naphthol | Red. |
| 2 | ......do...... | 1,phenyl-3-methyl-5-pyrazolone | Orange. |
| 3 | ......do...... | Aceto acetanilide | Do. |
| 4 | ......do...... | Meta-tolylene-diamine | Brown. |
| 5 | 1-(PAB amino) 2-chlor-4-amino-benzene→(MAB J-acid)₂ | Beta naphthol | Red. |
| 6 | 1-(PAB amino) 2-5-dimethoxy-4-amino-benzene→(PAB J-acid)₂ | ......do...... | Brown. |
| 7 | 1-(PAB amino) 2-5-dimethoxy-4-amino-benzene→(MAB J-acid)₂ | ......do...... | Do. |
| 8 | 1-(MAB amino) 2-5-dimethoxy-4-amino-benzene→(PAB J-acid)₂ | ......do...... | Do. |
| 9 | 1-(MAB amino) 2-5-dimethoxy-4-amino-benzene→(MAB J-acid)₂ | ......do...... | Do. |
| 10 | 1-(PAB amino) 2-methoxy-5-methyl-4-amino-benzene→(PAB J-acid)₂ | ......do...... | Do. |
| 11 | 1-(PAB amino) 2-methoxy-5-methyl-4-amino-benzene→(MAB J-acid)₂ | ......do...... | Do. |
| 12 | 1-(PAB amino) 4-amino-benzene-2-sulfonic acid→(PAB J-acid)₂ | ......do...... | Orange. |
| 13 | 1-(PAB amino) 5-amino-benzene-2-sulfonic acid→(PAB J-acid)₂ | ......do...... | Do. |
| 14 | 1-(PAB amino) 2-methoxy-4-amino-benzene→(PAB J-acid)₂ | ......do...... | Scarlet. |
| 15 | 1-(PAB amino) 2-methoxy-4-amino-benzene→(MAB J-acid)₂ | ......do...... | Do. |
| 16 | 1-(PAB amino) 2-methoxy-5-amino-benzene→(PAB J-acid)₂ | ......do...... | Do. |
| 17 | 1-(PAB amino) 2-methoxy-5-amino-benzene→(MAB J-acid)₂ | ......do...... | Do. |
| 18 | 1-(PAB amino) 4-amino-naphthalene→(PAB J-acid)₂ | ......do...... | Red. |
| 19 | 1-(PAB amino) 4-amino-naphthalene→(MAB J-acid)₂ | ......do...... | Do. |
| 20 | 1-(PAB amino) 4-amino-benzene-2-sulfonic acid→(MAB J-acid)₂ | ......do...... | Orange. |
| 21 | 1-(PAB amino) 5-amino-benzene-2-sulfonic acid→(MAB J-acid)₂ | ......do...... | Do. |
| 22 | 1-(PAB amino) 2-amino-naphthalene→(PAB J-acid)₂ | ......do...... | Red. |
| 23 | 1-(PAB amino) 2-amino-naphthalene→(MAB J-acid)₂ | ......do...... | Do. |

The actual method of applying these materials to the fiber is illustrated by the following example:

Example 24

Five parts of cotton piece goods are dyed in the usual manner, known to those skilled in the art, with two hundredths parts of 1-(PAB amino) 2-chlor-4-amino-benzene ⇌ (para-amino-benzoyl-J-acid)₂.

The dyed fabric is rinsed in cold water and put in 200 parts of water at 20° C. Add three tenths parts of sodium nitrite and four tenths part of sulfuric acid. Stir 15 minutes. Rinse with cold water. Dissolve one-tenth part of beta naphthol in 200 parts water and one twentieth part of caustic soda. Stir the solution rapidly while adding the above rinsed piece goods. Stir for 15 minutes. Rinse in cold water and dry. The dyeing is a red shade. The probable formula of the dye on the fiber is:

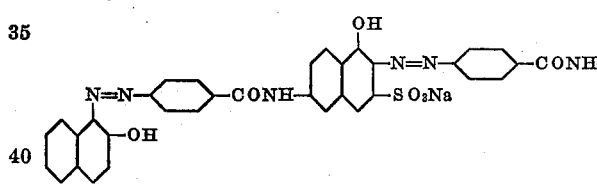

The same method is applicable to the other dyes of this invention.

The new dyes are of outstanding fastness to washing when produced on cellulose by development. The compounds are generally represented by the formula:

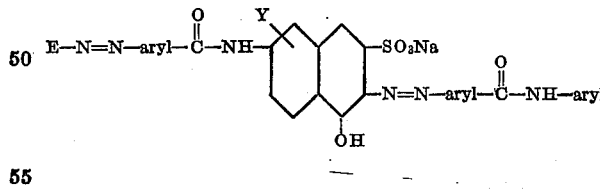

in which E is a nucleus of a component from the group consisting of beta-naphthol, acetoacet-anilide, meta-tolylene-diamine, and 1-phenyl-3-methyl-5-pyrazolone, aryl is a component having a single benzene or naphthalene nucleus, and Y is one of the group consisting of hydrogen, halogen, alkyl, and alkoxy.

As many apparently widely different embodiments of this invention may be made without departing from the spirit and scope thereof, it is to be understood that I do not limit myself to the specific embodiments thereof except as defined in the appended claims.

I claim:

1. A compound represented by the formula:

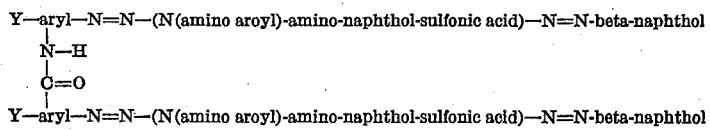

in which Y is one or more of a group consisting of halogen, hydrogen, alkyl, alkoxy, and sulfonic acid, and aryl is of single benzene or naphthalene nucleus.

2. A compound represented by the formula:

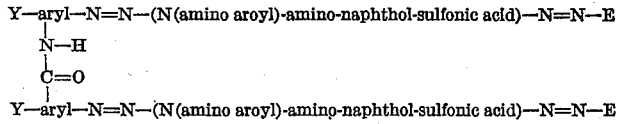

in which Y is one or more of a group consisting of halogen, hydrogen, alkyl, alkoxy, and sulfonic acid, E is a component from the group consisting of beta-naphthol, acetoacet-anilide, meta-tolylene-diamine, 1-phenyl-3-methyl-5-pyrazolone, and aryl is a single benzene or naphthalene nucleus.

3. A compound represented by the formula:

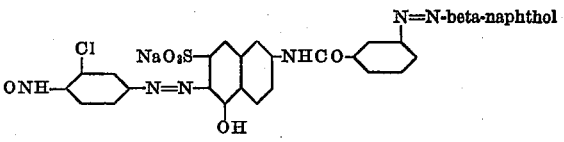

4. A compound represented by the formula:

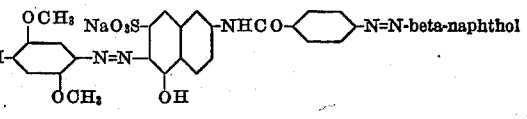

5. A compound represented by the formula:

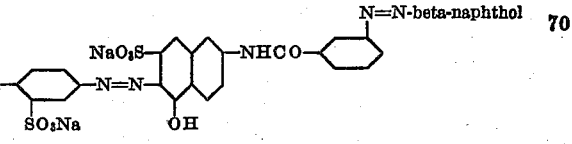

6. The process which comprises applying to cellulose from an aqueous bath a compound represented by the formula:

Y-aryl—N=N—(N(amino-aroyl)—amino-naphthol-sulfonic acid)
\
NH
|
C=O
/
Y-aryl—N=N—(N(amino-aroyl)—amino-naphthol-sulfonic acid)

in which Y is one or more of the group consisting of hydrogen, alkyl, sulfonic acid, halogen, and alkoxy, diazotizing it on the cellulose, and coupling it to a component from the group consisting of beta-naphthol, acetoacet-anilide, meta-tolylene-diamine, and 1-phenyl-3-methyl-5-pyrazolone.

SWANIE S. ROSSANDER.